(12) United States Patent
Orvedahl et al.

(10) Patent No.: US 12,654,944 B2
(45) Date of Patent: Jun. 16, 2026

(54) METERING SYSTEM AND METHOD

(71) Applicant: Transportation IP Holdings, LLC, Norwalk, CT (US)

(72) Inventors: Matthew Orvedahl, Caledonia, WI (US); Mark David, Milwaukee, WI (US); Ozan Emsun, Milwaukee, CT (US); Mario Di Benedetto, Big Bend, WI (US)

(73) Assignee: Transportation IP Holdings, LLC, Norwalk, CT (US)

( * ) Notice: Subject to any disclaimer, the term of this patent is extended or adjusted under 35 U.S.C. 154(b) by 280 days.

(21) Appl. No.: 18/514,332

(22) Filed: Nov. 20, 2023

(65) Prior Publication Data

US 2024/0208719 A1     Jun. 27, 2024

Related U.S. Application Data

(60) Provisional application No. 63/476,583, filed on Dec. 21, 2022.

(51) Int. Cl.
B65G 11/20          (2006.01)
B65G 47/88          (2006.01)

(52) U.S. Cl.
CPC ........ B65G 11/203 (2013.01); B65G 47/8884 (2013.01); *B65D 2590/547* (2013.01)

(58) Field of Classification Search
CPC .............. B65G 11/203; B65G 47/8884; B65G 2201/047; B65D 2590/547; B21J 15/32; B23P 19/003
USPC .................................................. 198/530, 532
See application file for complete search history.

(56) References Cited

U.S. PATENT DOCUMENTS

| | | | | |
|---|---|---|---|---|
| 448,589 | A | * | 3/1891 | Simonson ............ B65G 11/203 193/40 |
| 2,402,097 | A | * | 6/1946 | Spraker .............. B65G 47/1478 193/32 |
| 4,031,709 | A | * | 6/1977 | Blankemeyer ....... B65G 11/203 405/175 |
| 4,122,933 | A | * | 10/1978 | Starzyk ..................... F41A 9/83 89/33.14 |
| 4,208,153 | A | * | 6/1980 | Trethewy ................. B21J 15/32 221/124 |
| 5,259,723 | A | * | 11/1993 | Willis ................ B65G 47/8815 198/463.6 |

(Continued)

OTHER PUBLICATIONS

CN 110171706 merged with translation (Year: 2019).*
CN 108974909 Merged wuith translation (Year: 2018).*

*Primary Examiner* — Mark A Deuble
(74) *Attorney, Agent, or Firm* — K&L Gates LLP

(57)          ABSTRACT

A metering system includes a frame, first and second gates, and an actuator. The frame defines a chute configured to receive a supply of fasteners and maintain the fasteners in a line. The first and second gates are each mounted to the frame and movable to advance into the chute and retract away from the chute. The actuator is mechanically coupled to the first gate and configured to advance and retract the first gate relative to the chute. The second gate is configured to move based on the movement of the first gate so that as the first gate advances into the chute to block movement of the fasteners in the chute the second gate retracts, and as the first gate retracts away from the chute the second gate advances into the chute to block the movement of the fasteners in the chute.

19 Claims, 5 Drawing Sheets

(56) References Cited

U.S. PATENT DOCUMENTS

| 5,426,930 | A | * | 6/1995 | Badiali | ............... | B65H 67/069 |
| | | | | | | 57/90 |
| 2023/0158619 | A1 | * | 5/2023 | Maiques Moral | ... | A43D 100/00 |
| | | | | | | 29/281.5 |

* cited by examiner

400

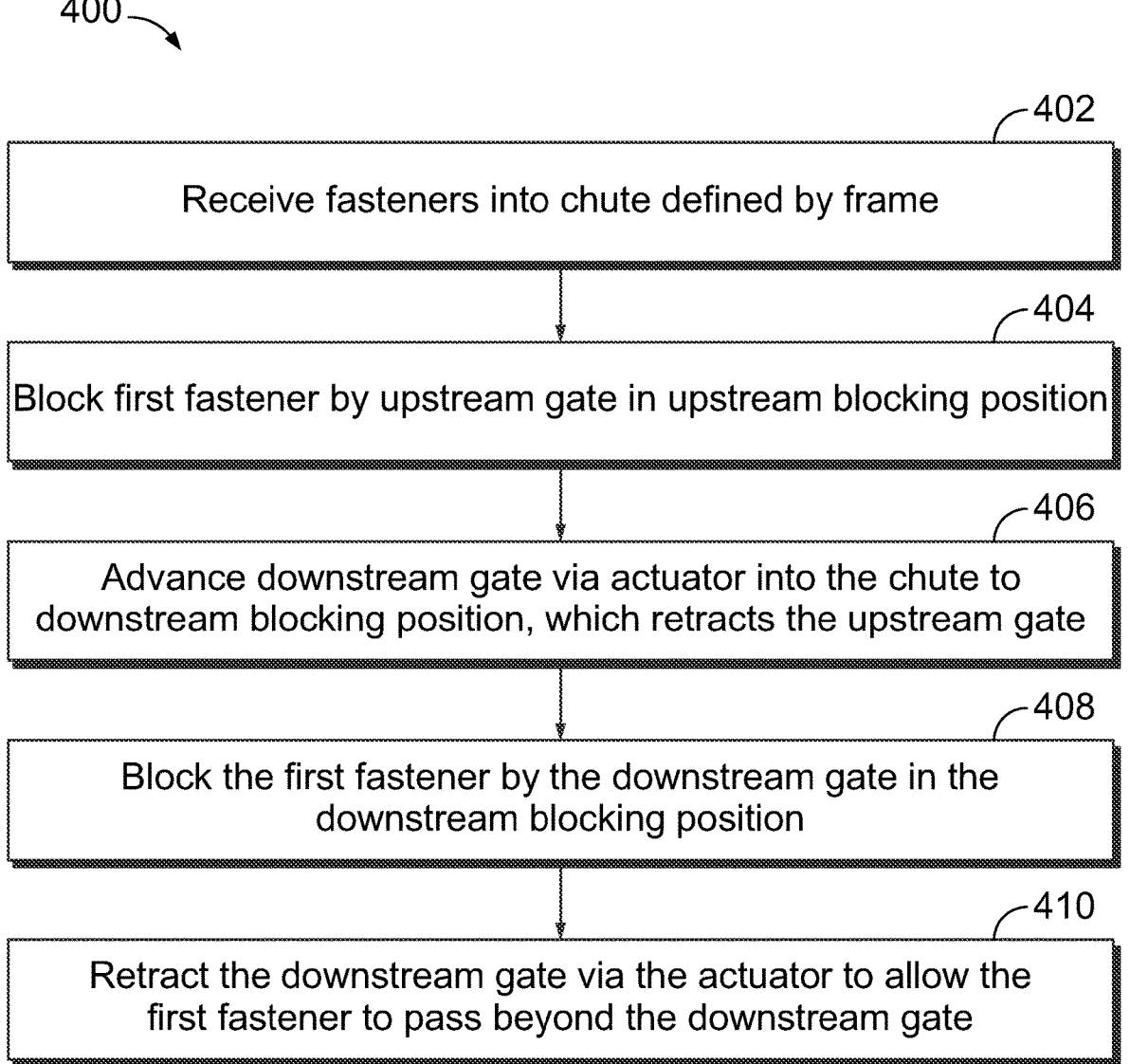

402

Receive fasteners into chute defined by frame

404

Block first fastener by upstream gate in upstream blocking position

406

Advance downstream gate via actuator into the chute to downstream blocking position, which retracts the upstream gate

408

Block the first fastener by the downstream gate in the downstream blocking position

410

Retract the downstream gate via the actuator to allow the first fastener to pass beyond the downstream gate

FIG. 9

METERING SYSTEM AND METHOD

CROSS-REFERENCE TO RELATED APPLICATIONS

This application is a non-provisional conversion of, and claims priority to, U.S. Provisional Patent Application No. 63/476,583, which was filed on Dec. 21, 2022, and the entire disclosure of which is incorporated herein by reference.

BACKGROUND

Technical Field.

The subject matter described herein relates to a system and method for regulating a feed of objects, such as fasteners, to operating equipment that uses the objects.

Discussion of Art.

Some industrial equipment is used to deliver fasteners into vehicle routes for constructing the routes. For example, a specialized rail vehicle may include a discharge device used to drive spikes into apertures or holes of plates disposed along the railroad track. The discharge device may be a hydraulic hammer. The equipment that includes the discharge device may be mounted on a vehicle, and may sequentially deliver the fasteners into the route at spaced apart locations along the length of the route. Some equipment for delivering fasteners includes automated feeder mechanisms designed to supply the fasteners one at a time to each discharge device at a controlled and constant feed rate. However, known automated feeder mechanisms suffer from inconsistency, which can cause delays that reduce the efficiency of the route construction operation. For example, some automated feeder mechanisms include a magnetic conveyor that conveys fasteners through magnetism. Other mechanisms use spring-loaded pads to press and retain the fasteners in the queue via frictional interference. These known mechanisms may be inconsistent at maintaining a constant feed rate of single fasteners. For example, some known mechanisms may occasionally feed two fasteners at once and/or feed a blank instead of a fastener. It may be desirable to have a metering system and method that is different than existing mechanisms.

BRIEF DESCRIPTION

In one or more embodiments, a metering system is provided that includes a frame, first and second gates, and an actuator. The frame defines a chute configured to receive a supply of fasteners and maintain the fasteners in a line. The first and second gates are each mounted to the frame and movable to advance into the chute and retract away from the chute. The actuator is mechanically coupled to the first gate and configured to advance and retract the first gate relative to the chute. The second gate is configured to move based on the movement of the first gate so that as the first gate advances into the chute to block movement of the fasteners in the chute the second gate retracts, and as the first gate retracts away from the chute the second gate advances into the chute to block the movement of the fasteners in the chute.

In one or more embodiments, a method for metering fasteners is provided. The method includes receiving a supply of fasteners into a chute defined by a frame. The fasteners are arranged in a line in the chute. A first fastener of the fasteners in the line may be blocked by an upstream gate while the upstream gate is in an upstream blocking position. The method includes advancing, via an actuator, a downstream gate into the chute to a downstream blocking position. Advancing the downstream gate may cause the upstream gate to retract from the upstream blocking position away from the chute, to permit the first fastener to pass beyond the upstream gate to the downstream gate which is in the downstream blocking position. The method includes retracting, via the actuator, the downstream gate from the downstream blocking position away from the chute to permit the first fastener to pass beyond the downstream gate within the chute. Retracting the downstream gate causes the upstream gate to advance into the chute to block a second fastener of the fasteners in the line.

In one or more embodiments, a metering system is provided that includes a frame, an upstream gate, a downstream gate, biasing member, and an actuator. The frame defines a chute configured to receive a supply of fasteners and maintain the fasteners in a line. The upstream gate and a downstream gate are mounted to the frame on opposite sides of the chute. Each of the upstream and downstream gates is movable to advance into the chute and retract away from the chute. The biasing member is configured to apply a biasing force on the upstream gate in a respective advancing direction towards the chute. The actuator is mechanically coupled to the downstream gate and configured to advance and retract the downstream gate relative to the chute. The downstream gate is operably connected to the upstream gate so that as the downstream gate advances into the chute, the downstream gate pushes the upstream gate away from the chute, against the biasing force, to retract the upstream gate and permit a first fastener of the fasteners in the chute to pass beyond the upstream gate to the downstream gate. As the downstream gate retracts, the first fastener is permitted to pass beyond the downstream gate to an outlet of the chute, and the biasing force advances the upstream gate into the chute to block a second fastener of the fasteners from moving beyond the upstream gate.

BRIEF DESCRIPTION OF THE DRAWINGS

The inventive subject matter may be understood from reading the following description of non-limiting embodiments, with reference to the attached drawings, wherein below:

FIG. 9 is a flowchart of a method for metering fasteners according to an embodiment.

DETAILED DESCRIPTION

Figures 1, 2:
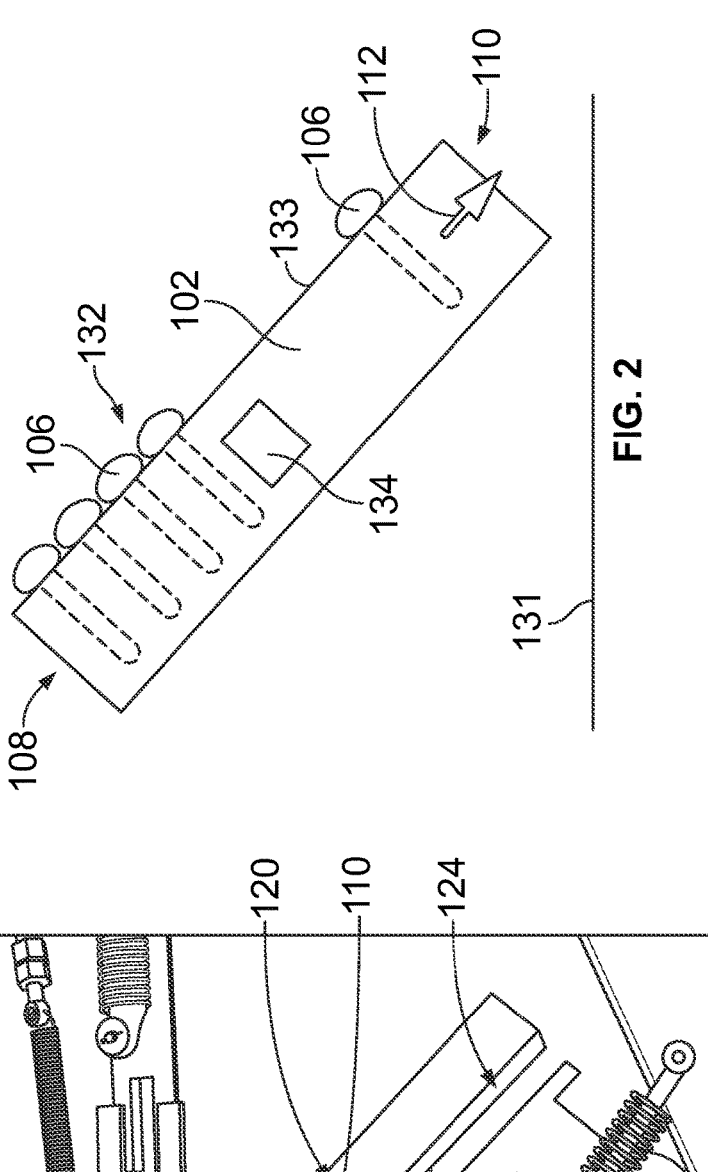
FIG. 1 illustrates a metering system according to an embodiment.
FIG. 2 illustrates a frame of the metering system from the side according to an embodiment.

Embodiments of the subject matter described herein relate to a metering system and method of metering the supply of objects to equipment that performs an operation with the objects. The system meters the supply of the objects by regulating a feed rate of the objects. For example, the metering system may consistently provide the objects one at a time at a constant feed rate. The metering system may be able to supply the objects at a selected feed rate of multiple different feed rates as determined by an operator or control system. The metering system is not limited to feeding a specific type of object. Various embodiments described herein use the metering system to feed fasteners. Although various examples described herein use fasteners as the objects, the metering system may be used to feed other types of objects in other examples. In some examples, the fasteners may be metal fasteners for industrial applications. For example, the fasteners may be spikes (e.g., tie spikes), bolts (e.g., Lewis bolts), rivets, nails, and/or the like. The fasteners may be relatively heavy and move along a chute of the metering system with substantial inertia. The metering system may be designed to accommodate and withstand the size, the weight, and the forces inherent with such industrial fasteners while providing reliable, consistent, and uniform metering of the fasteners. The metering system described herein may provide a consistent feed of single objects, such as fasteners, to increase the efficiency of automated operations that use the objects one at a time.

In one or more embodiments, the metering system includes a frame that defines a chute, and the chute receives a supply of fasteners. The metering system may include at least two gates. An upstream gate of the gates may be closer to an inlet of the chute than a proximity of a downstream gate of the gates to the inlet. Stated differently, the fasteners in a queue within the chute may encounter the upstream gate prior to encountering the downstream gate. Each of the gates can advance into the chute to block movement of the fasteners within the chute, and can retract away from the chute to enable at least one of the fasteners in the chute to pass beyond the respective gate. In an embodiment, at least two of the gates are operably connected such that movement of one of the gates causes the other gate to move. For example, the downstream gate may be actively advanced and retracted by a powered actuator, and the upstream gate may be automatically advanced and retracted in response to the movement of the downstream gate.

The mechanism of the metering system may be designed such that the upstream and downstream gates alternate between blocking the line of fasteners in the queue. The upstream and downstream gates may have a designated spacing distance therebetween that is based on the size of the fasteners or other feed objects in the chute. The space may be sufficient to accommodate only one of the fasteners. During the times that the upstream gate blocks the queue of fasteners in the chute, the downstream gate is retracted to enable the one fastener located in the space between the upstream and downstream gates to move beyond the downstream gate to an outlet of the chute. During a subsequent time in which the upstream gate is retracted and the downstream gate blocks the queue of fasteners, another single fastener moves into the space between the upstream and downstream gates. The feed rate of the metering system may be controlled based on the operation of the actuator that actively moves the corresponding gate. For example, an operator may increase a frequency at which the actuator controls the gates to increase the feed rate, and may decrease the frequency at which the actuator controls the gates to decrease the feed rate.

FIG. 1 illustrates a metering system 100 in accordance with an embodiment. The metering system 100 includes a frame 102. The frame defines a chute 104 that receives a supply of fasteners 106. The metering system may supply the fasteners, one at a time, to operating equipment that uses the fasteners. In an example application, the fasteners may be spikes (e.g., tie spikes). The spikes may be driven by a discharge device, which represents the operating equipment, into a substrate. The discharge device may be a hydraulic hammer. The substrate may be a route. The route may be a railroad track. The discharge device may drive the spikes into apertures or holes of plates disposed along the route. The holes may be prefabricated into the plates, or the holes may be formed by the spikes being driven into the plates.

The chute may be sized to maintain the fasteners in a line (e.g., a single file line). The chute includes an inlet 108 and an outlet 110. The chute extends in a downstream direction 112 from the inlet to the outlet. The fasteners are received into the chute through the inlet. The source of the fasteners may be a bulk container or bin. The fasteners may be supplied from the bulk container to the inlet of the chute via a conveyor, rollers, and/or the like. A width of the chute between a first edge 114 and a second edge 116 of the frame may be based on the size (e.g., diameter) of the fasteners to force the fasteners to adopt the single file line. For example, the width may be sufficiently narrow to prohibit two or more fasteners from being side-by-side along the width. The chute may be linear along its length in the illustrated embodiment, but may curve along the length in another embodiment.

The frame of the metering system may be connected to a diverter device 120. The diverter device defines multiple branch paths 122, 124 that divert from a common opening 126. The common opening is fluidly connected to the outlet of the chute. Each fastener that passes through the outlet is received into the common opening of the diverter device and gets directed along one of the branch paths. The paths may lead to different operating equipment that uses the fasteners. For example, the two paths shown in FIG. 1 may lead to two different discharge devices that can operate to install the fasteners on two different sections of a route, such as two different rails of a track. The diverter device may include a distributor member 128 that is pivoted by an actuator 130 to guide the fastener to the different branch paths in an alternating sequence.

In an example, the metering system may be installed onboard a vehicle system. The vehicle system may be a rail vehicle. In another example, the vehicle system may be an industrial or commercial vehicle that does not travel on rails or tracks. The vehicle system can be formed from a single vehicle or multiple vehicles. With respect to multi-vehicle systems, the vehicles can be mechanically coupled with each other (e.g., by couplers) or logically connected but not mechanically coupled. For example, vehicles may be logically connected but not mechanically coupled when the vehicles communicate with each other to coordinate movements of the vehicles with each other so that the vehicles travel together as a group, such as a convoy, consist, swarm, fleet, platoon, or train.

FIG. 2 illustrates the frame from the side according to an embodiment. The frame may be angled such that the chute defines a ramp (e.g., slope) 133 relative to a flat floor 131 or ground. For example, the inlet may be disposed above the outlet (e.g., at a greater height from the floor or ground than the outlet). The sloped orientation of the chute may be sufficient to cause the fasteners to slide in the downstream direction from the inlet towards the outlet due to gravitational force. The metering system includes a blocking mechanism 134 that sequentially moves multiple gates into the chute and out of the chute. The blocking mechanism is represented as a rectangle in FIG. 2 for simplicity, and is shown in more detail in other figures herein. When extending into the chute, the gates provide hard stop surfaces to block a queue 132 of multiple fasteners from free-sliding along the chute to the outlet. The gates may move relative to the chute with coordinated movements. In the illustrated embodiment, the sloped orientation of the frame enables gravity to provide a biasing force on the fasteners in the downstream direction towards the outlet. In another embodiment, the metering system may include powered rollers or another element that forces the fasteners in the downstream direction. For example, the metering system may not need to be oriented as a ramp if powered rollers urge the fasteners forward towards the outlet.

Figure 3:
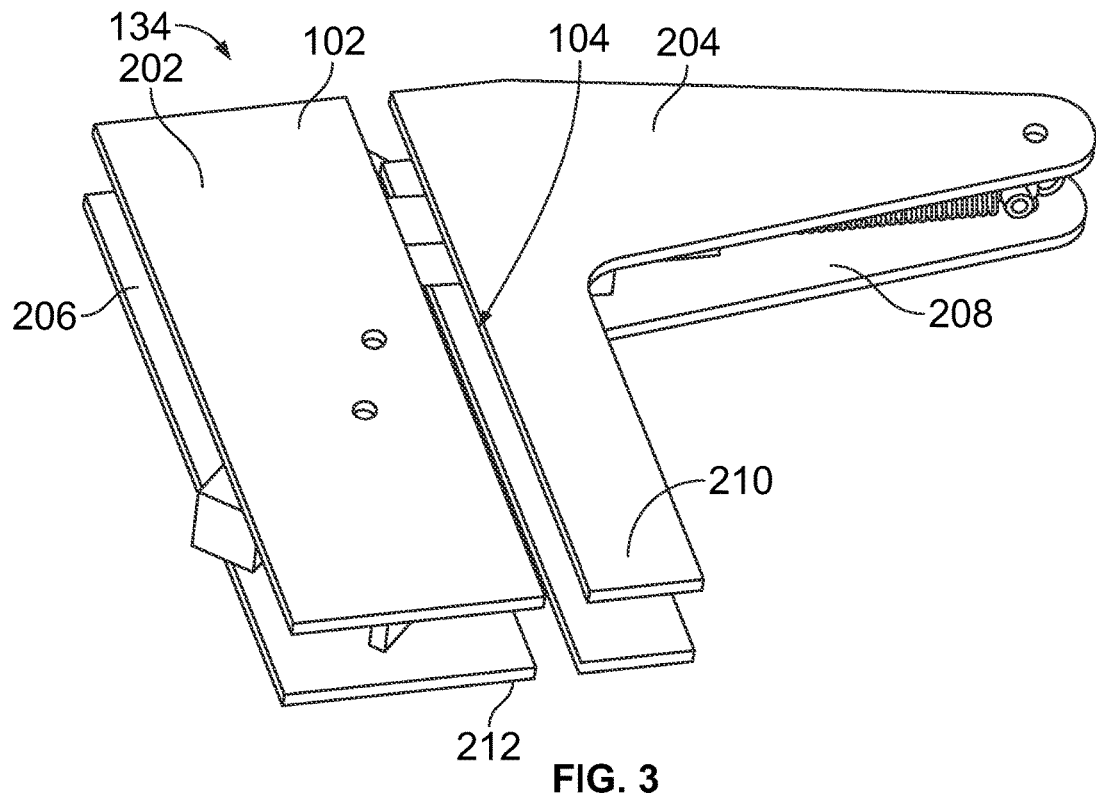
FIG. 3 is an isometric view of a blocking mechanism of the metering system according to an embodiment.

FIG. 3 is an isometric view of the blocking mechanism of the metering system 100 according to an embodiment. The blocking mechanism includes, or is coupled to, a portion of the frame that defines a section of the chute along the length between the inlet and the outlet. For example, the blocking mechanism may be disposed along a middle section of the chute, spaced apart from both the inlet and the outlet. In an embodiment, the blocking mechanism may be located closer to the outlet than the inlet, which enables a greater number of fasteners to stack in line along the chute upstream of the blocking mechanism. The portion of the frame includes a first (e.g., left) front plate 202, a second (e.g., right) front plate 204, a first (e.g., left) back plate 206, and a second (e.g., right) back plate 208. The left plates are separated from the right plates via the chute. The two front plates may be coplanar. The two back plates may be coplanar. The front plates may be parallel to the back plates. The fasteners in the chute may have a first portion above or in front of the front plates, and a second portion that extends from the first portion below or behind the back plates. For example, the fasteners may include heads that are broader than the chute. The heads may contact a front side 210 of the front plates. The fasteners may have shafts in the chute that extend from the heads beyond a back side 212 of the back plates.

Figure 4:
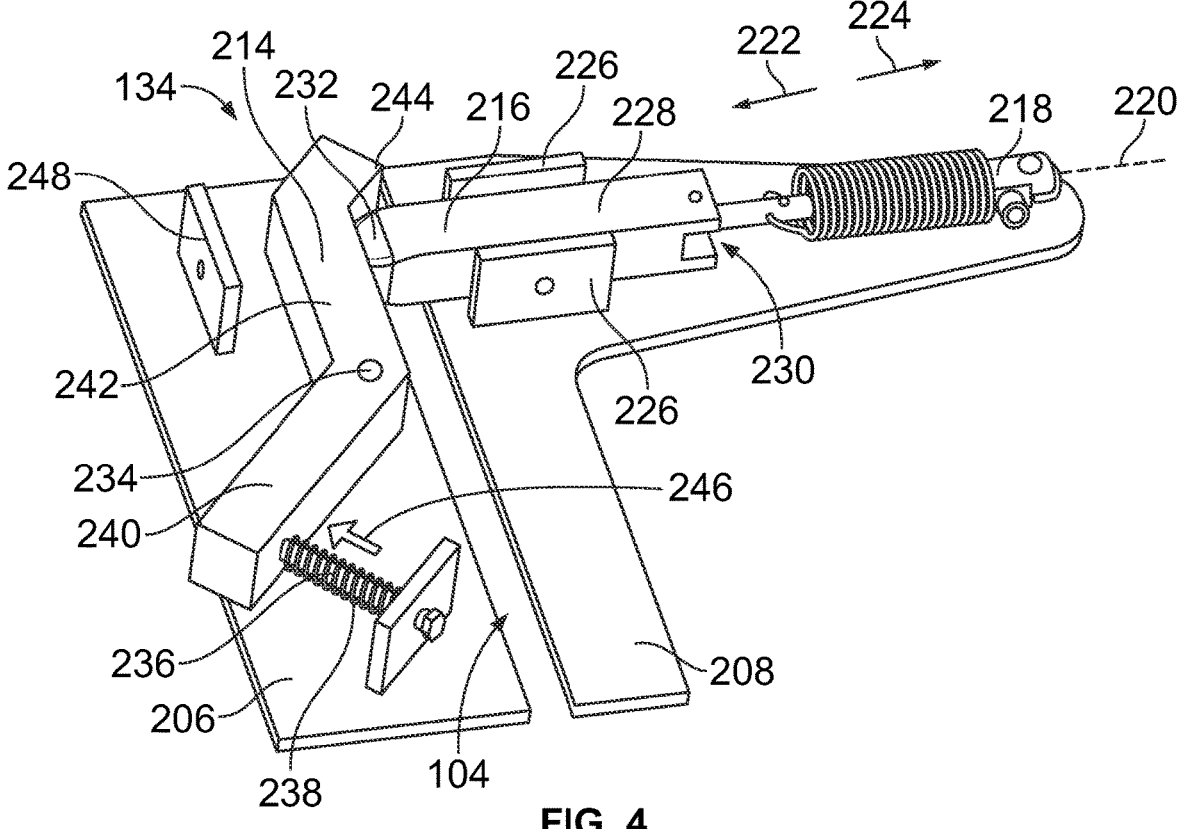
FIG. 4 is an isometric view of the blocking mechanism in FIG. 3 shown without front plates.

The blocking mechanism may include several components sandwiched between the front plates and the back plates. FIG. 4 is an isometric view of the blocking mechanism of FIG. 3 shown without the front plates. The blocking mechanism includes at least a first gate 216 and a second gate 214. The first and second gates may be mounted to the frame (e.g., via the plates) and movable to advance into the chute and retract away from the chute. In the illustrated orientation, the second gate extends into the chute at a location that is upstream of where the first gate extends into the chute relative to a feed direction of the fasteners through the chute. The second gate in this orientation is referred to herein as an upstream gate because the portion of the second gate that extends into the chute is disposed closer than the first gate to the inlet of the chute. The first gate in this orientation is referred to herein as a downstream gate because the portion of the first gate that extends into the chute is disposed closer than the second gate to the outlet of the chute. In an example, the upstream gate and the downstream gate may be mounted to the frame on opposite sides of the chute. For example, the upstream gate may be mounted to the left back plate, and the downstream gate may be mounted to the right back plate. Each of the upstream and downstream gates may generally move towards the other gate when advancing into the chute. In another example, both of the gates may be mounted along the same side of the chute.

The blocking mechanism may include an actuator 218 that is mechanically coupled to the first gate (e.g., the downstream gate according to the illustrated orientation). The actuator may operate to advance and retract the downstream gate relative to the chute. The actuator actively powers the movement of the downstream gate. The actuator may be an electric actuator, a pneumatic actuator, a hydraulic actuator, or the like. For example, the actuator may include a servomotor. In the illustrated embodiment, the actuator drives linear, reciprocal movement of the downstream gate in opposite advancing and retracting directions 222, 224 along an actuation axis 220. The blocking mechanism may include guide walls 226 on either side of the downstream gate to constrain movement of the downstream gate along the actuation axis. In an example, the downstream gate may have an oblong, linear body 228 that extends a length from a proximal end 230 of the downstream gate to a distal end 232 of the downstream gate. The proximal end may be coupled to the actuator 218. The distal end moves into and out of the chute.

In an embodiment, the upstream gate is coupled to the frame at a pivot member 234 and rotates about the pivot member when advancing and retracting relative to the chute. As compared to the linear travel of the downstream gate, the upstream gate may pivot into and out of the chute about the pivot member. In an embodiment, the movement of the upstream gate is caused by the powered movement of the downstream gate to provide coordinated movement of the gates. For example, the upstream gate may rotate due to the movement of the downstream gate. In an example, the downstream gate may contact the upstream gate as the downstream gate advances into the chute. The advancing downstream gate may push the upstream gate to retract out of the chute.

In an embodiment, the blocking mechanism includes a biasing member 236. The biasing member may be coupled to the upstream gate. In an example, the biasing member applies a biasing force on the upstream gate that urges the upstream gate to advance towards the chute. The biasing member may include or represent a spring 238 and may exert a spring force on the upstream gate. The spring force may be consistent. The upstream gate in the illustrated example has a proximal segment 240 and a distal segment 242 that are separated by the pivot member. The distal segment includes a distal end 244 that extends into the chute. The biasing member may be attached to the proximal segment. In an example, the biasing member exerts a biasing force on the proximal segment in a biasing direction 246, which urges the upstream gate to rotate clockwise about the pivot member such that the distal end advances into the chute. In this embodiment, the upstream gate retracts upon the downstream gate pushing the distal segment of the upstream gate in the advancing direction 222 with sufficient force to overcome the biasing force. The blocking mechanism may include a stop plate 248 that backs up the distal segment of the upstream gate to limit a range of rotation of the upstream gate.

Figures 5, 6:
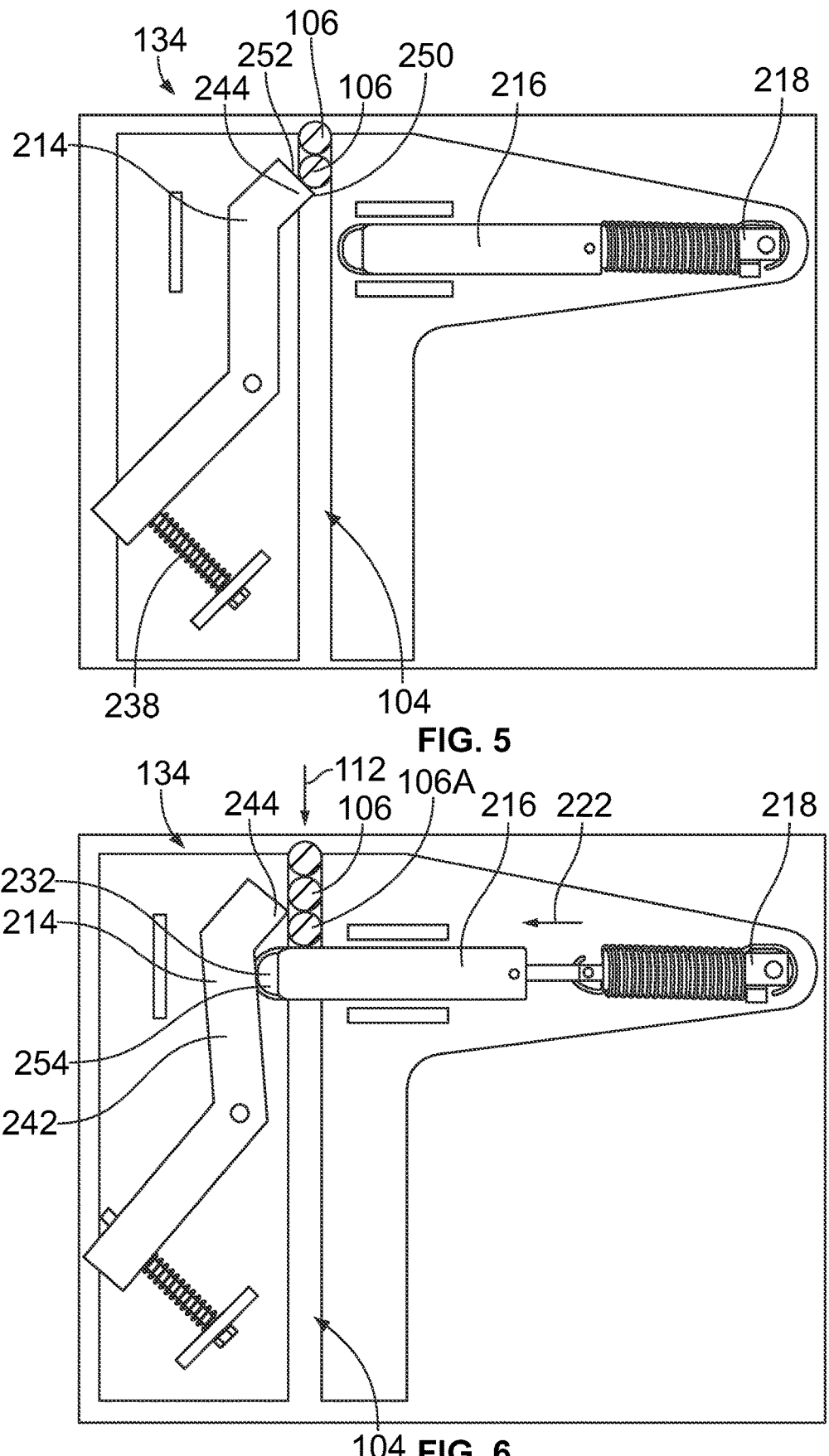
FIG. 5 is a plan view of the blocking mechanism shown in FIGS. 3 and 4 at a first positional state during operation of the metering system.
FIG. 6 is a plan view of the blocking mechanism in FIG. 5 at a second positional state during operation of the metering system.
Figures 7, 8:
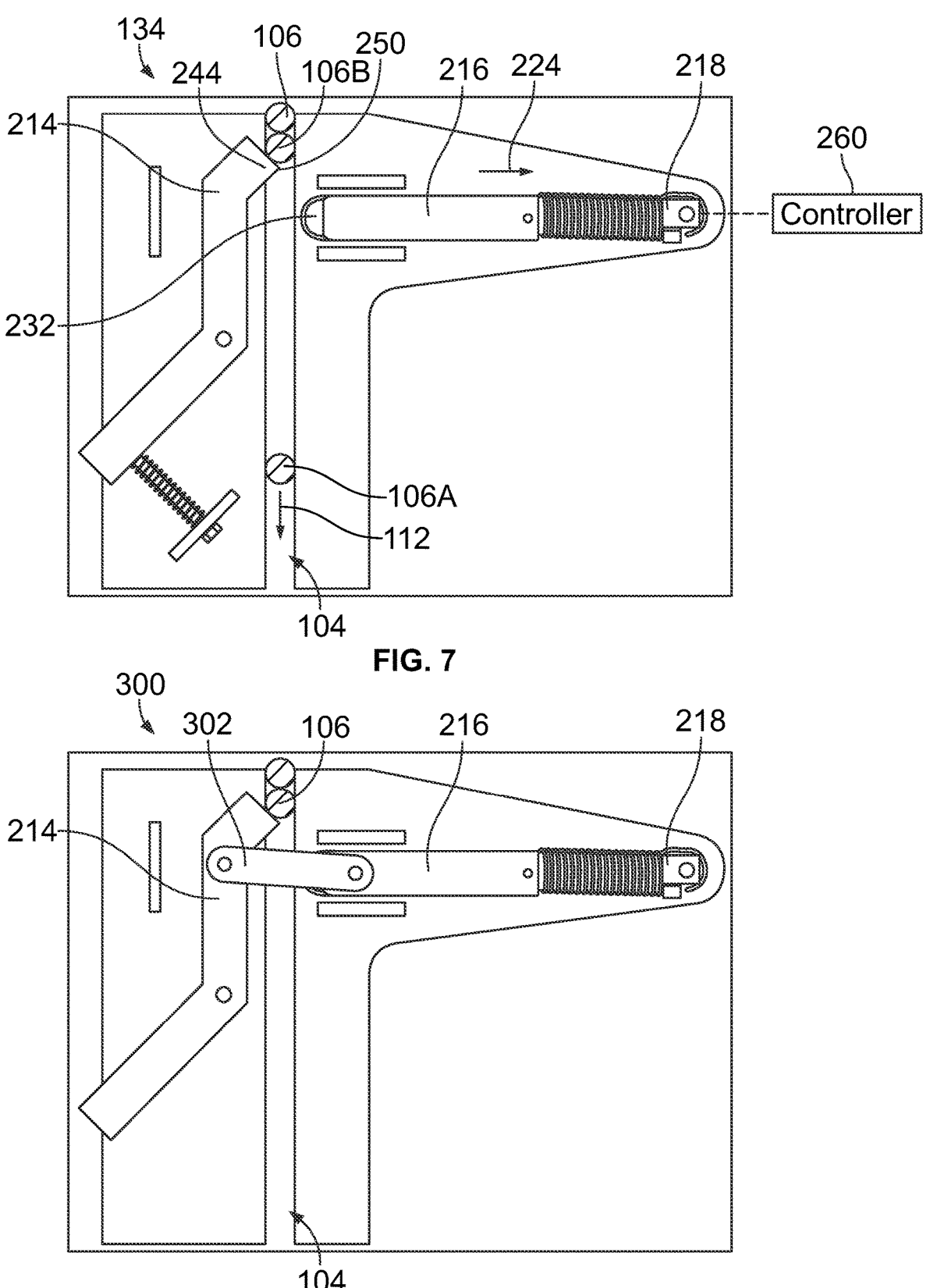
FIG. 7 is a plan view of the blocking mechanism in FIGS. 5 and 6 at a third positional state during operation of the metering system.
FIG. 8 is a plan view of a blocking mechanism of the metering system according to an alternative embodiment.

FIG. 5 is a plan view of the blocking mechanism shown in FIGS. 3 and 4 at a first positional state during operation of the metering system. FIG. 6 is a plan view of the blocking mechanism of FIG. 5 at a different, second positional state during operation of the metering system. FIG. 7 is a plan view of the blocking mechanism of FIGS. 5 and 6 at a different, third positional state during operation of the metering system. The first, second, and third positional states may occur in chronological order such that the first positional state shown in FIG. 5 occurs before the second and third positional states and the second positional state shown in FIG. 6 occurs before the third positional state.

In the first positional state, the upstream gate is in a respective advanced position, and the downstream gate is in a respective retracted position. The actuator may actively control the positioning of the downstream gate. In the retracted position, the downstream gate may be outside of the chute and may not interfere with movement of the fasteners in the chute. The fasteners are shown in cross-section in FIGS. 5 through 7 to show relevant parts of the blocking mechanism. With the downstream gate retracted, the upstream gate may be in a respective advanced position. For example, the biasing force exerted by the biasing member may cause the upstream gate to rotate clockwise so that the distal end extends into the chute. The distal end of the upstream gate in the chute may block the fasteners in the chute from moving beyond the upstream gate. In an embodiment, the distal end of the upstream gate may have a wedge shape. The wedge tapers to an edge 250 that can extend into a narrow space between two adjacent fasteners in the line. In the advanced position, the fasteners may abut an upper surface 252 of the wedge-shaped distal end. The advanced position of the upstream gate is also referred to herein as an upstream blocking position. In the first positional state of the blocking mechanism, the upstream gate blocks the path of the fasteners. The downstream gate does not block the path.

In the second positional state, the downstream gate is in a respective advanced position, and the upstream gate is in a respective retracted position. For example, the downstream gate may block the path of the fasteners, and the upstream gate does not block the path. The advanced position of the downstream gate is also referred to herein as a downstream blocking position. The actuator may drive the downstream gate in the advancing direction to achieve the downstream blocking position. This movement causes the distal end of the downstream gate to enter the chute. In an example, the distal end of the downstream gate may contact the distal portion of the upstream gate. The downstream gate may push the distal portion of the upstream gate away from the chute with sufficient force to overcome the biasing force and retract the upstream gate. The actuator may continue to advance the downstream gate such that the distal end moves beyond the chute and pushes the upstream gate a sufficient distance that the distal end of the upstream gate exits the chute. The distal end of the downstream gate may include a bumper 254 to avoid damaging the surface of the upstream gate and/or making a loud noise upon contacting the proximal segment of the upstream gate. The bumper may be relatively compliant, such as rubber or a rubber-like material. As a result of the upstream gate being pushed out of the path to the retracted position, the fasteners are able to move in the downstream direction beyond the upstream gate. The advanced downstream gate extends across the chute and blocks additional movement of the fasteners from sliding beyond the downstream gate.

Relative to FIG. 5, the fasteners in the queue in FIG. 6 are essentially shifted down one fastener diameter closer to the outlet. For example, a first fastener 106A in the line passed beyond the upstream gate to the downstream gate. The upstream and downstream gates may be positioned with a designated longitudinal spacing between the respective distal ends, when in the respective advanced position. The upstream and downstream gates may be assembled so that only one fastener can be accommodated in the space between the distal end of the upstream gate and the distal end of the downstream gate when in the second positional state.

The third positional state in FIG. 7 may be achieved by the actuator retracting the downstream gate from the advanced position shown in FIG. 6. The third positional state is essentially a repeat of the first positional state. For example, the upstream gate may block the path of the fasteners, and the downstream gate does not block the path. As the downstream gate retracts in the respective retracting direction, the distal end of the downstream gate may move away from the upstream gate and eventually exit the chute. The biasing force on the upstream gate may automatically advance the upstream gate towards the chute. For example, the edge of the wedge-shaped distal end may enter a narrow gap between the first fastener 106A and a second fastener 106B that is adjacent to the first fastener (before the downstream gate fully exits the chute). The edge of the wedge-shaped distal end may squeeze the second fastener against the opposite edge of the frame. The upstream gate may block the second fastener and the other fasteners upstream of the second fastener from moving beyond the upstream gate to the downstream gate. The first fastener is already beyond the upstream gate. As the downstream gate retracts, the first fastener is able to pass beyond the downstream gate in the downstream direction to the outlet. The first fastener may be provided to the diverter device or directly to operating equipment that will use the first fastener.

This sequence described above with respect to FIGS. 5 through 7 may repeat to sequentially meter the fasteners one at a time at a controlled feed rate. In an example, the actuator may be the only component that is powered and controlled. The actuator may reciprocally advance and retract the downstream gate at a controlled frequency. The frequency of the actuator may be selected and/or modified to supply the fasteners one at a time at a designated feed rate. The designated feed rate may be determined based on an operator command that is provided via a user input device, an operating rate of the equipment that uses the fasteners, a regulation, and/or the like.

The actuator may be communicatively connected to a controller 260, as shown in FIG. 7, which controls the operating frequency of the actuator. The controller represents hardware circuitry that includes and/or is connected with one or more processors (e.g., one or more microprocessors, integrated circuits, microcontrollers, field programmable gate arrays, etc.). The controller includes and/or is connected with the memory, which stores program instructions (e.g., software) that are executed by the one or more processors to perform the controller operations described herein. The controller may communicate with the actuator by generating control signals that are communicated via a wired pathway, or alternatively may be wirelessly communicated. The controller may be communicatively connected to a sensor that measures the feed rate at which the fasteners are supplied from the metering system. The controller may use the sensor to control the actuator using a feedback loop. For example, the controller may compare the measured feed rate, as measured by the sensor, to a designated (e.g., selected) feed rate. In response to the measured feed rate differing from the designated feed rate by more than a threshold margin (e.g., 1%, 5%, or the like), the controller may change the frequency of the actuator to reduce the discrepancy between the measured feed rate and the designated feed rate.

FIG. 8 is a plan view of a blocking mechanism 300 of the metering system according to a second embodiment. In FIG. 8, the upstream and downstream gates may be the same as in the embodiment shown in FIGS. 3 through 7. The illustrated embodiment differs from the previous embodiment because the downstream gate is mechanically connected to the upstream gate via a mechanical linkage 302. The mechanical linkage may extend across the chute without interfering with the movement of the fasteners along the chute. For example, the linkage may be suspended above the heads of the fasteners with sufficient clearance to avoid contacting the fasteners. In an embodiment, when the actuator advances the downstream gate toward the chute (as described in the first embodiment), the mechanical linkage forces the upstream gate away from the chute to retract the upstream gate. Furthermore, as the actuator retracts the downstream gate away from the chute (as described in the first embodiment), the mechanical linkage pulls the upstream gate towards the chute to advance the upstream gate. In this embodiment, the blocking system may omit a biasing member on the upstream gate, because both the retraction and advancement of the upstream gate is propelled by the movement of the downstream gate via the linkage. The upstream and downstream gates may interact with the fasteners in the same way as described with reference to the first embodiment.

In another embodiment, the blocking mechanism may include a biasing member that exerts a biasing force on the upstream gate in a respective retracting direction away from the chute. For example, the biasing force may urge the upstream gate shown in FIG. 4 to rotate counter-clockwise about the pivot member. The downstream gate may separate from the upstream gate when the downstream gate advances into the chute, which permits the biasing force to retract the upstream gate. As the downstream gate is retracted by the actuator away from the chute, the downstream gate may contact the upstream gate and pull the upstream gate towards the chute with sufficient force to overcome the biasing force and advance the upstream gate into the chute. For example, the downstream gate may include an arm that projects towards the upstream gate and abuts against the upstream gate as the downstream gate retracts. The arm may disconnect from the upstream gate as the downstream gate advances towards the chute. In this second alternative embodiment, the upstream and downstream gates may interact with the fasteners in the same way as described with reference to the first embodiment.

In an alternative embodiment, the upstream and downstream gates may be flipped 180 degrees relative to the feed direction of the fasteners in the chute. For example, the blocking mechanisms of the embodiments shown in FIGS. 3 through 7 and FIG. 8 may be flipped 180 degrees without changing the working mechanism of the assembly. In this flipped orientation, the first gate 216 that is mechanically coupled to and driven by the actuator 218 advances into the chute upstream of the second gate 214 relative to the feed direction of the fasteners. As such, the first gate may be referred to as the upstream gate, and the second gate may be referred to as the downstream gate.

FIG. 9 is a flowchart 400 of a method for metering fasteners according to an embodiment. The method may be performed in whole or in part by the metering system and the blocking mechanism thereof, according to the embodiments described herein. The method may include more steps than shown, fewer steps than shown, and/or different steps than shown in FIG. 9. At step 402, a supply of fasteners is received into a chute defined by a frame. The fasteners may be arranged in a line in the chute. At step 404, a first fastener of the fasteners in the line may be blocked by an upstream gate while the upstream gate is in an upstream blocking position.

At step 406, a downstream gate is advanced via an actuator into the chute to a downstream blocking position. Advancing the downstream gate may cause the upstream gate to retract from the upstream blocking position away from the chute to allow the first fastener to pass beyond the upstream gate within the chute to the downstream gate. At step 408, the downstream gate blocks the first fastener while the downstream gate is in the downstream blocking position.

At step 410, the downstream gate is retracted via the actuator from the downstream blocking position away from the chute to allow the first fastener to pass beyond the downstream gate within the chute. Retracting the downstream gate may cause the upstream gate to advance into the chute to block a second fastener of the fasteners in the line. In an embodiment, advancing and retracting the downstream gate may include reciprocally moving the downstream gate in opposite directions along a linear path. The upstream gate may be coupled to the frame at a pivot member. The advancing and retracting of the downstream gate may cause the upstream gate to rotate about the pivot point in retracting and advancing directions, respectively, of the upstream gate.

In an example, the method may include orienting the frame such that the chute defines a ramp down which the fasteners slide from an inlet of the chute towards an outlet of the chute due to gravitational force. The upstream gate may be disposed closer than the downstream gate to the inlet. The method may also include applying a biasing force on the upstream gate in a respective advancing direction towards the chute. For example, the biasing force urges the upstream gate towards the upstream blocking position.

In an example, the method includes controlling the actuator to reciprocally perform the advancing and retracting steps at a controlled frequency to supply the fasteners one at a time through an outlet of the chute at a designated feed rate. After retracting the downstream gate, the method may include providing the first fastener, after moving along the chute beyond the downstream gate, to a discharge device configured to drive the first fastener into an aperture in a plate disposed along a vehicle route. In an example, the discharge device may be a hydraulic hammer. The vehicle route may be a railroad track.

In an embodiment, a metering system includes a frame, first and second gates, and an actuator. The frame defines a chute configured to receive a supply of fasteners and maintain the fasteners in a line. The first and second gates are each mounted to the frame and movable to advance into the chute and retract away from the chute. The actuator is mechanically coupled to the first gate and configured to advance and retract the first gate relative to the chute. The second gate is configured to move based on the movement of the first gate so that as the first gate advances into the chute to block movement of the fasteners in the chute the second gate retracts, and as the first gate retracts away from the chute the second gate advances into the chute to block the movement of the fasteners in the chute.

The frame may define a ramp, and the fasteners in the chute may slide down the ramp in a direction from an inlet of the chute towards an outlet of the chute due to gravitational force. The first gate may be operably connected to the second gate so that the first gate advancing into the chute pushes the second gate away from the chute to retract the second gate. The metering system may include a biasing member configured to apply a biasing force on the second gate in a respective advancing direction towards the chute. The first gate may be operably connected to the second gate so that the first gate retracting away from the chute pulls the second gate towards the chute to advance the second gate. The metering system may include a biasing member configured to apply a biasing force on the second gate in a respective retracting direction away from the chute. The first gate may be mechanically connected to the second gate via a mechanical linkage. The first gate advancing toward the chute may cause the mechanical linkage to retract the second gate away from the chute.

The actuator may reciprocally advance and retract the first gate at a controlled frequency to supply the fasteners one at a time through an outlet of the chute at a designated feed rate. The actuator may linearly move the first gate in opposite advancing and retracting directions along an actuation axis. The second gate may be coupled to the frame via a pivot member and may rotate about the pivot member when advancing and retracting.

The first gate may be a downstream gate and the second gate may be an upstream gate. The downstream gate may extend into the chute at a location downstream of where the upstream gate extends into the chute relative to a feed direction of the fasteners in the chute. As the downstream gate advances into the chute, the upstream gate may retract and permit a first fastener of the fasteners to pass beyond the upstream gate to the downstream gate. As the downstream gate retracts away from the chute, the first fastener in the chute may be permitted to pass beyond the downstream gate and the upstream gate may advance into the chute to block a second fastener of the fasteners from passing beyond the upstream gate. A distal end of the upstream gate may have a wedge shape.

The first gate may be an upstream gate, and the second gate may be a downstream gate. The downstream gate may extend into the chute at a location downstream of where the upstream gate extends into the chute relative to a feed direction of the fasteners in the chute.

In an embodiment, a metering system includes a frame, an upstream gate, a downstream gate, and an actuator. The frame defines a chute that receives a supply of fasteners and maintains the fasteners in a line. The upstream gate and the downstream gate are each mounted to the frame and movable to advance into the chute and retract away from the chute. The actuator is mechanically coupled to the downstream gate and configured to advance and retract the downstream gate relative to the chute. The upstream gate moves based on the movement of the downstream gate such that when the actuator advances the downstream gate into the chute, the upstream gate automatically retracts and a first fastener of the fasteners in the chute is able to pass beyond the upstream gate to the downstream gate. When the actuator thereafter retracts the downstream gate, the first fastener in the chute is able to pass beyond the downstream gate, and the upstream gate automatically advances into the chute to block a second fastener of the fasteners from moving beyond the upstream gate to the downstream gate.

The upstream gate and the downstream gate may be mounted to the frame on opposite sides of the chute. The chute may extend in a downstream direction from an inlet of the chute to an outlet of the chute. The upstream gate may be disposed closer than the downstream gate to the inlet, and the downstream gate may be disposed closer than the upstream gate to the outlet. The frame may be oriented such that the chute defines a ramp and the fasteners in the chute slide down the ramp in a direction from the inlet of the chute towards the outlet due to gravitational force.

The downstream gate may be operably connected to the upstream gate such that the downstream gate advancing into the chute physically contacts the upstream gate and pushes the upstream gate away from the chute to retract the upstream gate. The metering system may include a biasing member that applies a biasing force on the upstream gate in a respective advancing direction towards the chute. In an example, the downstream gate may be operably connected to the upstream gate such that the downstream gate retracting away from the chute pulls the upstream gate towards the chute to advance the upstream gate. The metering system may include a biasing member that applies a biasing force on the upstream gate in a respective retracting direction away from the chute. The downstream gate may be mechanically connected to the upstream gate via a mechanical linkage such that the downstream gate advancing toward the chute causes the mechanical linkage to force the upstream gate away from the chute to retract the upstream gate.

In an example, a distal end of the upstream gate has a wedge shape. The actuator may reciprocally advance and retract the downstream gate at a controlled frequency to supply the fasteners one at a time through an outlet of the chute at a designated feed rate. The actuator may linearly move the downstream gate in opposite advancing and retracting directions along an actuation axis. The upstream gate may be coupled to the frame at a pivot member and may rotate about the pivot point when advancing and retracting.

In an embodiment, a method for metering fasteners includes receiving a supply of fasteners into a chute defined by a frame. The fasteners may be arranged in a line in the chute. The method may include blocking a first fastener of the fasteners in the line by an upstream gate while the upstream gate is in an upstream blocking position. The method may include advancing, via an actuator, a downstream gate into the chute to a downstream blocking position. Advancing the downstream gate may cause the upstream gate to retract from the upstream blocking position away from the chute, to permit the first fastener to pass beyond the upstream gate within the chute to the downstream gate (in the downstream blocking position). The method may include retracting, via the actuator, the downstream gate from the downstream blocking position away from the chute to permit the first fastener to pass beyond the downstream gate within the chute. Retracting the downstream gate may cause the upstream gate to advance into the chute to block a second fastener of the fasteners in the line.

In an example, the method includes orienting the frame such that the chute defines a ramp down which the fasteners slide from an inlet of the chute towards an outlet of the chute due to gravitational force. The upstream gate may be disposed closer than the downstream gate to the inlet. The method may include applying a biasing force on the upstream gate in a respective advancing direction towards the chute. The method may include controlling the actuator to reciprocally perform the advancing and retracting steps at a controlled frequency to supply the fasteners one at a time through an outlet of the chute at a designated feed rate. Advancing and retracting the downstream gate may include reciprocally moving the downstream gate in opposite directions along a linear path. The upstream gate may be coupled to the frame at a pivot member, and the advancing and retracting of the downstream gate may cause the upstream gate to rotate about the pivot point in retracting and advancing directions, respectively, of the upstream gate. The method may include providing the first fastener, after moving along the chute beyond the downstream gate, to a discharge device configured to drive the first fastener into an aperture in a plate disposed along a vehicle route.

Advancing and retracting the downstream gate may include reciprocally moving the downstream gate in opposite directions along a linear path. The upstream gate may be coupled to the frame at a pivot member. The advancing and retracting of the downstream gate may cause the upstream gate to rotate about the pivot point in retracting and advancing directions, respectively, of the upstream gate.

In an embodiment, a metering system includes a frame, an upstream gate, a downstream gate, a biasing member, and an actuator. The frame defines a chute configured to receive a supply of fasteners and maintain the fasteners in a line. The upstream gate and a downstream gate may be mounted to the frame on opposite sides of the chute. Each of the upstream and downstream gates may be movable to advance into the chute and retract away from the chute. The biasing member is configured to apply a biasing force on the upstream gate in a respective advancing direction towards the chute. The actuator is mechanically coupled to the downstream gate and configured to advance and retract the downstream gate relative to the chute. The downstream gate is operably connected to the upstream gate so that as the downstream gate advances into the chute, the downstream gate pushes the upstream gate away from the chute, against the biasing force, to retract the upstream gate and permit a first fastener of the fasteners in the chute to pass beyond the upstream gate to the downstream gate. As the downstream gate retracts, the first fastener is permitted to pass beyond the downstream gate to an outlet of the chute, and the biasing force advances the upstream gate into the chute to block a second fastener of the fasteners from moving beyond the upstream gate.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A metering system comprising:
   a frame that defines a chute configured to receive a supply of fasteners and maintain the fasteners in a line;
   first and second gates each mounted to the frame and movable to advance into the chute and retract away from the chute; and
   an actuator mechanically coupled to the first gate and configured to advance and retract the first gate relative to the chute,
   the second gate configured to move based on the movement of the first gate so that as the first gate advances into the chute to block movement of the fasteners in the chute the second gate retracts, and as the first gate retracts away from the chute the second gate advances into the chute to block the movement of the fasteners in the chute,
   wherein the first gate is operably connected to the second gate so that the first gate retracting away from the chute pulls the second gate towards the chute to advance the second gate.

2. The metering system of claim 1, wherein the frame defines a ramp and the fasteners in the chute are configured to slide down the ramp in a direction from an inlet of the chute towards an outlet of the chute due to gravitational force.

3. The metering system of claim 1, wherein the first gate is operably connected to the second gate so that the first gate advancing into the chute pushes the second gate away from the chute to retract the second gate.

4. The metering system of claim 3, further comprising a biasing member configured to apply a biasing force on the second gate in a respective advancing direction towards the chute.

5. The metering system of claim 1, further comprising a biasing member configured to apply a biasing force on the second gate in a respective retracting direction away from the chute.

6. The metering system of claim 1, wherein the first gate is mechanically connected to the second gate via a mechanical linkage, wherein the first gate advancing toward the chute causes the mechanical linkage to retract the second gate away from the chute.

7. The metering system of claim 1, wherein the actuator is configured to reciprocally advance and retract the first gate at a controlled frequency to supply the fasteners one at a time through an outlet of the chute at a designated feed rate.

8. The fastener metering system of claim 1, wherein the actuator is configured to linearly move the first gate in opposite advancing and retracting directions along an actuation axis.

9. The fastener metering system of claim 1, wherein the second gate is coupled to the frame via a pivot member and is configured to rotate about the pivot member when advancing and retracting.

10. The metering system of claim 1, wherein the first gate is a downstream gate and the second gate is an upstream gate, the downstream gate extending into the chute at a location downstream of where the upstream gate extends into the chute relative to a feed direction of the fasteners in the chute, wherein as the downstream gate advances into the chute, the upstream gate retracts and permits a first fastener of the fasteners to pass beyond the upstream gate to the downstream gate, and as the downstream gate retracts away from the chute, the first fastener in the chute is permitted to pass beyond the downstream gate and the upstream gate advances into the chute to block a second fastener of the fasteners from passing beyond the upstream gate.

11. The metering system of claim 10, wherein a distal end of the upstream gate has a wedge shape.

12. The metering system of claim 1, wherein the first gate is an upstream gate and the second gate is a downstream gate, the downstream gate extending into the chute at a location downstream of where the upstream gate extends into the chute relative to a feed direction of the fasteners in the chute.

13. A method for metering fasteners, the method comprising:

receiving a supply of fasteners into a chute defined by a frame, the fasteners arranged in a line in the chute, wherein a first fastener of the fasteners in the line is blocked by an upstream gate while the upstream gate is in an upstream blocking position;

advancing, via an actuator, a downstream gate into the chute to a downstream blocking position, wherein advancing the downstream gate causes the upstream gate to retract from the upstream blocking position away from the chute, to permit the first fastener to pass beyond the upstream gate to the downstream gate which is in the downstream blocking position; and retracting, via the actuator, the downstream gate from the downstream blocking position away from the chute to permit the first fastener to pass beyond the downstream gate within the chute, wherein retracting the downstream gate causes the upstream gate to advance into the chute to block a second fastener of the fasteners in the line, wherein the downstream gate is operably connected to the upstream gate so that the downstream gate retracting away from the chute pulls the upstream gate towards the chute to advance the upstream gate.

14. The method of claim 13, further comprising orienting the frame to define a ramp down which the fasteners slide from an inlet of the chute towards an outlet of the chute due to gravitational force, the upstream gate disposed closer than the downstream gate to the inlet.

15. The method of claim 13, further comprising applying a biasing force on the upstream gate in a respective advancing direction towards the chute.

16. The method of claim 13, further comprising controlling the actuator to reciprocally perform the advancing and retracting steps at a controlled frequency to supply the fasteners one at a time through an outlet of the chute at a designated feed rate.

17. The method of claim 13, wherein advancing and retracting the downstream gate comprises reciprocally moving the downstream gate in opposite directions along a linear path.

18. The method of claim 13, wherein the upstream gate is coupled to the frame at a pivot member, and the advancing and retracting of the downstream gate causes the upstream gate to rotate about a pivot point in retracting and advancing directions, respectively, of the upstream gate.

19. A metering system comprising:

a frame that defines a chute configured to receive a supply of fasteners and maintain the fasteners in a line;

an upstream gate and a downstream gate mounted to the frame on opposite sides of the chute, each of the upstream and downstream gates movable to advance into the chute and retract away from the chute;

a biasing member configured to apply a biasing force on the upstream gate in a respective advancing direction towards the chute; and an actuator mechanically coupled to the downstream gate and configured to advance and retract the downstream gate relative to the chute, the downstream gate operably connected to the upstream gate so that as the downstream gate advances into the chute, the downstream gate pushes the upstream gate away from the chute, against the biasing force, to retract the upstream gate and permit a first fastener of the fasteners in the chute to pass beyond the upstream gate to the downstream gate, and as the downstream gate retracts, the first fastener is permitted to pass beyond the downstream gate to an outlet of the chute, and the biasing force advances the upstream gate into the chute to block a second fastener of the fasteners from moving beyond the upstream gate.

\* \* \* \* \*